United States Patent [19]
Yasue et al.

[11] Patent Number: 5,833,565
[45] Date of Patent: Nov. 10, 1998

[54] OIL PRESSURE CONTROL SYSTEM FOR AUTOMATIC TRANSMISSION

[75] Inventors: Hideki Yasue, Toyota; Hiromichi Kimura, Okazaki, both of Japan

[73] Assignee: Toyota Jidosha Kabushiki Kaisha, Toyota, Japan

[21] Appl. No.: 864,413

[22] Filed: May 28, 1997

[30] Foreign Application Priority Data

May 29, 1996 [JP] Japan ................................. 8-157557

[51] Int. Cl.⁶ ................................................ F16H 61/00
[52] U.S. Cl. ............................ 475/156; 475/158; 475/98
[58] Field of Search ................................. 477/151, 156, 477/158, 98

[56] References Cited

U.S. PATENT DOCUMENTS

| | | | |
|---|---|---|---|
| 3,703,110 | 11/1972 | Uozumi et al. | 477/158 X |
| 4,301,697 | 11/1981 | Iwanaga et al. | 477/156 |
| 4,394,827 | 7/1983 | Kubo et al. | 477/156 |
| 4,428,258 | 1/1984 | Kubo et al. | 477/151 |
| 4,858,496 | 8/1989 | Iwatsuki et al. | 477/98 X |
| 5,014,575 | 5/1991 | Fujiwara et al. | 477/98 X |
| 5,088,357 | 2/1992 | Kamada et al. | 477/98 X |
| 5,107,725 | 4/1992 | Takahashi | 477/158 X |
| 5,303,614 | 4/1994 | Sakaki et al. | 477/158 |
| 5,323,668 | 6/1994 | Nakagawa et al. | 477/158 X |
| 5,405,303 | 4/1995 | Takada et al. | 477/158 X |

FOREIGN PATENT DOCUMENTS

63 40655  3/1988  Japan .

*Primary Examiner*—Dirk Wright
*Assistant Examiner*—Peter T. Kwon
*Attorney, Agent, or Firm*—Oblon, Spivak, McClelland, Maier & Neustadt, P.C.

[57] ABSTRACT

An oil pressure control system for an automatic transmission in which an initial pressure of oil pressures to be fed selectively to apply frictional engagement elements is controlled according to an engine load. The control system comprises an oil pressure keeper for keeping the initial pressure during a shift at a constant level independent of the engine load. Thus, the rates of feeding the oil pressures to the frictional engagement elements are constant so that the shift shock is suppressed to reduce the factors for the oil pressure fluctuation thereby to facilitate the control.

5 Claims, 7 Drawing Sheets

| RANGE | | SOLENOID VALVE | | | FIRST SPEED CHANGE UNIT | | | | | SECOND SPEED CHANGE UNIT | | |
|---|---|---|---|---|---|---|---|---|---|---|---|---|
| | | S1 | S2 | S3 | C1 | C2 | B1 | B2 | F1 | C3 | B3 | F2 |
| D | 1 | ○ | ○ | × | ○ | | | | ◎ | | ○ | ◎ |
| | 2 | × | ○ | × | ○ | | ○ | | | | ○ | ◎ |
| | 3 | ○ | × | × | ○ | ○ | | | | | ○ | ◎ |
| | 4 | ○ | × | ○ | ○ | ○ | | | | ○ | | |

OIL PRESSURE CONTROL SYSTEM FOR AUTOMATIC TRANSMISSION

BACKGROUND OF THE INVENTION

1. Field of the Invention

The present invention relates to a system for controlling the initial pressure of oil pressures for applying the frictional engagement elements of an automatic transmission for a vehicle.

2. Related Art

The frictional engagement elements for setting gear stages in the vehicular automatic transmission are applied by the oil pressures. The valves for controlling the frictional engagement elements are also actuated by the oil pressures. Therefore, an oil pump is driven by the power of the engine to build up an oil pressure, and this oil pressure is regulated to an initial pressure having a predetermined level and used for switching the valves and for controlling the apply/release of the frictional engagement elements.

This initial pressure is usually called the "line pressure", which is regulated by a primary regulator valve. A signal pressure according to an engine load (e.g., a throttle opening) is applied to the primary regulator valve so that the line pressure is set to a level according to the engine output. As a result, the line pressure will not rise higher than necessary so that the power to be consumed for building up the oil pressure is not wasted to improve the fuel economy advantageously. Moreover, the torque capacities of the frictional engagement elements to be applied for setting the gear stages can match the input torque thereby to prevent a disadvantage such as the slips of the frictional engagement elements.

Usually, the aforementioned line pressure is set to such a level as to provide torque capacities slightly higher than those required of the frictional engagement elements for the input torque. When a shift is executed, however, the frictional engagement elements being applied are connected with the drain so that they may be released, and the oil pressure is fed to apply other frictional engagement elements. At a shifting time, therefore, the oil pressure line communicates with the drain or a space having a considerable capacity, and the oil pressure in the entire oil pressure line may temporarily drop. In this case, the torque capacities of the frictional engagement elements being kept in the applied states may lower to cause the slips. In the invention disclosed in JUA-63-40655, therefore, the line pressure is boosted at the shifting time.

In the invention disclosed in the publication, the line pressure is boosted at the shifting time so that the torque capacities of the frictional engagement elements are kept larger than those required at that time even when the oil pressure lowers according to the shift. In this pressure rise, however, the line pressure at the shifting time is controlled to rise. In the state of a low line pressure because of a low engine load, therefore, the raised line pressure is lower than that which is raised in the high line pressure state because of a high engine load.

In the prior art, more specifically, the line pressure is controlled according to the engine load so that it changes with the engine load. Even when the line pressure is raised, its initial pressure is controlled on the basis of the engine load so that the raised oil pressure rises/lowers according to the engine load. The line pressure is the initial pressure to be fed to apply the frictional engagement elements, as described above. When this initial pressure fluctuates, the rate of feeding to the frictional engagement elements and the so-called "pack clearances" of the frictional engagement elements is shortened to fluctuate the time period till the torque capacities are substantially established. This change in the line pressure causes the discrepancy of the timings for applying the frictional engagement elements to participate in the shift. As a result, there may occur a disadvantage that the shock is deteriorated by the abrupt change in the output torque or that the time period required for the shift is elongated to deteriorate the shift responsibility.

Especially in the case of the so-called "clutch-to-clutch shift" in which two or more clutches or brakes are simultaneously applied/released, the engine overshoots when the torque capacities of the frictional engagement elements participating in the shift reduce. When the torque capacities are high together, on the other hand, the automatic transmission comes into the so-called "tie-up state", in which the output torque lowers to cause a problem of deterioration of the shift shock. This makes it necessary to control the timings for applying/releasing the frictional engagement elements participating in the shift, properly at all times. However, when the line pressure or the initial pressure fluctuates to high and low levels although controlled to rise, the oil pressure control may probably be complicated either by the extreme difficulty in the timing control of applying/releasing the frictional engagement elements participating in the clutch-to-clutch shift or by the necessity for changing the control parameters of the oil pressure in accordance with the change in the line pressure.

SUMMARY OF THE INVENTION

A main object of the present invention is to provide an oil pressure control system for an automatic transmission, which can control a shift easily.

An oil pressure control system for an automatic transmission in which an initial pressure of oil pressures to be fed selectively to apply frictional engagement elements is controlled according to an engine load. The control system comprises oil pressure keeping means for keeping the initial pressure during a shift at a constant level independent of the engine load.

In the present invention, therefore, the initial pressure for applying the frictional engagement elements is held at a constant level during the shift so that the rate of feeding the oil pressure to the frictional engagement elements participating in the shift is held constant independently of the running state of the vehicle at the shifting time. In other words, the discrepancy in the timing for applying the frictional engagement elements can be prevented to facilitate the shift control. Moreover, the shift responsibility is improved when the initial pressure to be shifted at the shifting time is set to a high level.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

DESCRIPTION OF THE PREFERRED EMBODIMENT

Figure 4:
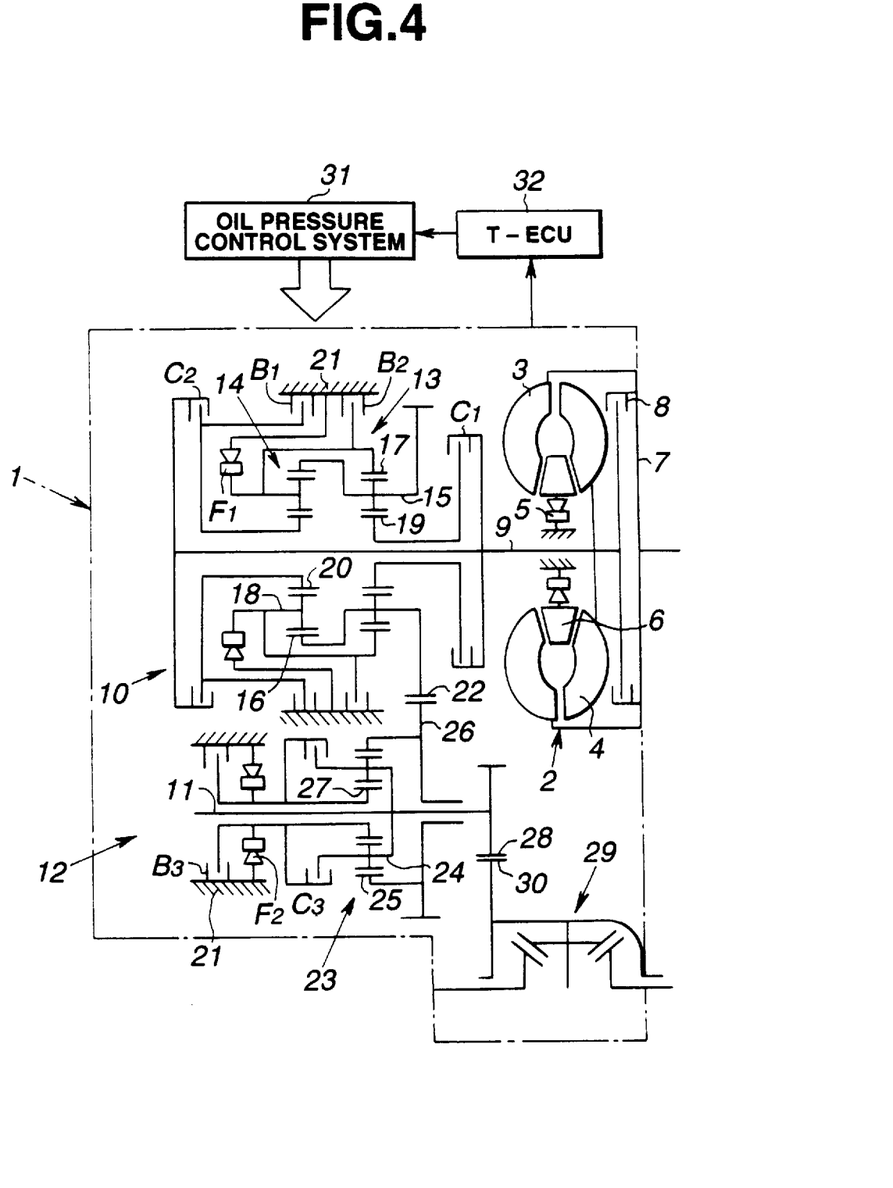
FIG. 4 is a conceptional diagram showing one example of a gear train of an automatic transmission, to which is applied the present invention, and an overall control system.

The present invention will be more specifically described with reference to the accompanying drawings. First of all, here will be described one example of an automatic transmission to which is applied the present invention. An automatic transmission 1, as shown in FIG. 4, is of the so-called "transverse type automatic transmission", as arranged transversely of a vehicle and is connected to the (not-shown) engine through a torque converter 2. This torque converter 2 is similar to one generally used in the prior art, and a turbine runner 4 is arranged to face a pump impeller 3 which is rotationally driven by the torque coming from the engine. Moreover, a stator 6, as retained by a one-way clutch 5, is arranged between those pump impeller 3 and turbine runner 4, and a lockup clutch 8 is interposed between a front cover 7, as integrated with the pump impeller 3, and the turbine runner 4. In alignment with the torque converter 2, there is arranged an input shaft 9, which is connected to the turbine runner 4.

A first speed change unit 10 is aligned with the input shaft 9, and a second speed change unit 12 is aligned with a counter shaft 11 which is arranged in parallel with the input shaft 9. The first speed change unit 10 is composed mainly of a first planetary gear mechanism 13 and a second planetary gear mechanism 14 individually of the single pinion type. These planetary gear mechanisms 13 and 14 are so arranged adjacent to each other that the carrier 15 of the first planetary gear mechanism 13, as located at the righthand side of FIG. 4, and the ring gear 16 of the second planetary gear mechanism 14, as located at the lefthand side of FIG. 4, are connected to rotate together, and that the ring gear 17 of the first planetary gear mechanism 13 and the carrier 18 of the second planetary gear mechanism 14 are connected to rotate together.

There is provided a first clutch C1 for transmitting the torque of the input shaft 9 selectively to the sun gear 19 of the first planetary gear mechanism 13. The first clutch C1 is arranged between the torque converter 2 and the first planetary gear mechanism 13. There is further provided a second clutch C2 for transmitting the torque of the input shaft 9 selectively to the sun gear 20 of the second planetary gear mechanism 14. The second clutch C2 is arranged at the opposite side (as located at the lefthand end portion of FIG. 4) of the first clutch C1 across the individual planetary gear mechanisms 13 and 14.

As brake means, on the other hand, there are provided a first brake B1 for stopping the rotation of the sun gear 20 of the second planetary gear mechanism 14 selectively and a second brake B2 for stopping the rotations of the ring gear 17 and the carrier 18, as integrated with each other, selectively. These brakes B1 and B2 are exemplified by the multi-disc type or the band type, and the first brake B1 is arranged between the sun gear 20 and a casing 21 where the second brake B2 is arranged between the ring gear 17 or the carrier 18 and the casing 21. In parallel with the second brake B2, moreover, there is arranged a first one-way clutch F1. This first one-way clutch F1 is applied, when the integrated ring gear 17 and carrier 18 are to rotate in the opposite direction of the input shaft 9, to stop their rotations.

With the carrier 15 in the first planetary gear mechanism 13, there is integrated a counter drive gear 22, which is arranged between the first planetary gear mechanism 13 and the first clutch C1.

The individual clutches C1 and C2, brakes B1 and B2 and one-way clutch F1 thus far described are the frictional engagement elements of the present invention, which are properly applied/released to set one reverse gear stage and a plurality of forward gear stages in the first speed change unit 10.

Here will be described the second speed change unit 12. This second speed change unit 12 is composed mainly of a third planetary gear mechanism 23 of the single pinion type. In this third planetary gear mechanism 23, a carrier 24 is connected to rotate together with the counter shaft 11, and a ring gear 25 is integrated with a counter driven gear 26 which is arranged rotatably in alignment with the counter shaft 11. Incidentally, the counter driven gear 26 is in meshing engagement with the counter drive gear 22.

There is further provided a third clutch C3 for connecting the carrier 24 and the sun gear 27 of the third planetary gear mechanism 23 selectively. Between the sun gear 27 and the casing 21, moreover, there are arranged in parallel a third brake B3 of the multi-disc type or the band type and a second one-way clutch F2 so that the sun gear 27 may be selectively fixed by those third brake B3 and second one-way clutch F2. Incidentally, this second one-way clutch F2 is applied, when the sun gear 27 rotates in the opposite direction of the ring gear 25, to stop the rotation of the sun gear 27.

As a result, the second speed change unit 12 is set to an under-drive state at a lower gear stage or a direct-connected state at a higher gear stage by applying the third clutch C3, the third brake B3 or the second one-way clutch F2.

To the end portion of the counter shaft 11 a the side of the counter driven gear 26, there is attached an output gear 28 which is in meshing engagement with the ring gear 30 of a front differential 29 or the final reduction gear mechanism.

The individual clutches C1, C2 and C3 and the individual brakes B1, B2 and B3 thus far described are frictional engagement elements to be activated by the oil pressure which is fed/drained by an oil pressure control system 31. This oil pressure control system 31 is constructed by solenoid valves to regulate the line pressure or its entire initial pressure, to change the gear stages, to regulate the oil pressure during the speed change and to control the apply/release of the lockup clutch 8.

There is further provided an electronic control unit (T-ECU) 32 for executing the speed change and the pressure regulation by outputting signals to the individual solenoid valves in that oil pressure control system 31. This electronic control unit 32 is composed mainly of a central processing unit (CPU), a memory unit (RAM, ROM) and an input/output interface, and is fed for its control with a shift position signal, a pattern select switch signal, an overdrive switch signal, a manual shift switch signal, an output shaft RPM signal and a turbine RPM signal. Moreover, the electronic control unit 32 decides the gear stage on the basis of the input data and a map stored in advance and outputs an instruction signal to the oil pressure control system 31 on the basis of the decision result to regulate the shift and the regulated pressure at the shift time and to control the ON/OFF of the lockup clutch 8.

Figure 5:
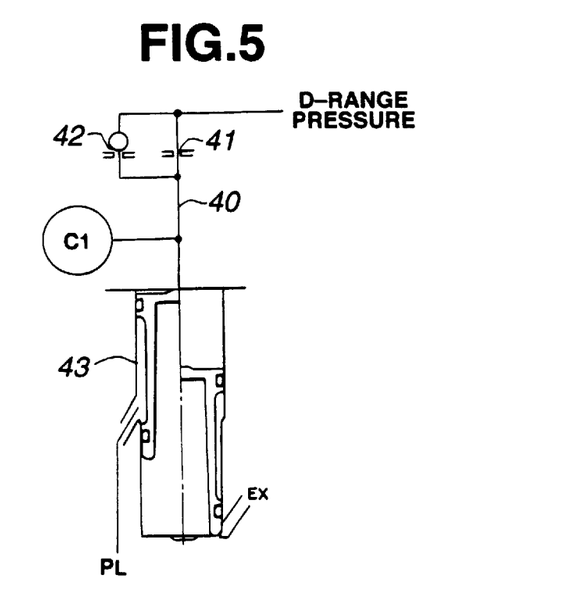
FIG. 5 is a diagram of a portion of a hydraulic circuit, as directed to a first clutch.

Here will be described the hydraulic circuit for controlling the apply/release of each of the frictional engagement elements. The first description will be made on the first clutch C1, which is always applied when a forward gear stage is to be set. As shown in FIG. 5, therefore, the first clutch C1 is connected via an oil passage 40 with the D-range port of the manual valve (although both are not shown). This D-range port is one for outputting the oil pressure even when any range for the forward run is selected, so that the oil pressure is fed to the first clutch C1 by selecting the forward running range. Moreover, the oil passage 40 is provided with an orifice 41 and an orifice 42 having a check ball in parallel, so that an accumulator 43 is connected by those orifices 41 and 42 with the side of the first clutch C1.

Figure 6:
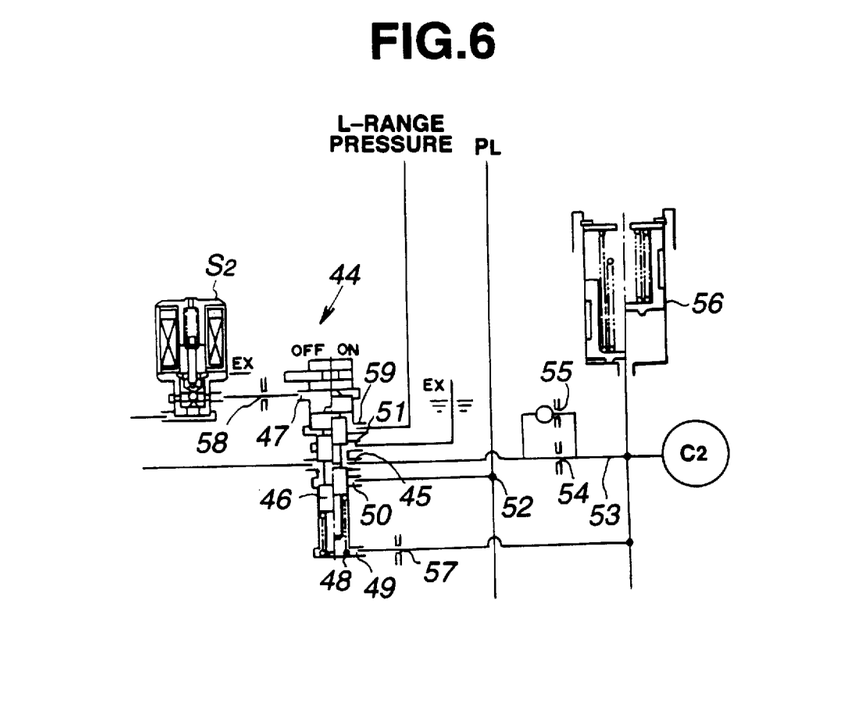
FIG. 6 is a diagram of a portion of the hydraulic circuit, as directed to a second clutch.

Here will be described the second clutch C2. As shown in FIG. 6, this second clutch C2 is connected with an output port 45 of the second clutch control valve 44. This second clutch control valve 44 is one for feeding/draining and regulating the oil pressure to and from the second clutch C2, and is constructed to change the oil passages by a spool 46 having three lands. Of these, the land, as formed at one end portion of the spool 46, is given a larger diameter than those of the remaining lands, and a control port 47 is formed to be opened in the end portion side of the diametrically large land. At the end portion opposed to the control port 47, there is arranged a spring 48 for urging the spool in the axial direction, and a feedback port 49 is opened in the portion where the spring 48 is arranged.

The output port 45 is formed in the axially intermediate portion, across which are formed an input port 50 and a drain port 51. More specifically, the input port 50 is formed closer to the feedback port 49 than the output port 45, and the drain port 51 is formed at the opposite side. The input port 50 is connected with a line pressure oil passage 52 so that it is fed with the initial pressure of the entirety of the oil pressure control system 31, that is, the line pressure PL which is regulated according to the throttle opening.

On the other hand, an oil passage 53 connecting the output port 45 and the second clutch C2 is provided with an orifice 54 and an orifice 55 having a check ball, which are arranged in parallel with each other. Moreover, a damper 56 is connected to the side closer to the second clutch C2 than those orifices 54 and 55, and the feedback port 49 is connected via an orifice 57 with the second clutch C2. Incidentally, the damper 56 is equipped with a spring-biased piston so that it absorbs the oil pressure when the piston retracts while compressing the spring, to level the oil pressure to be fed to the second clutch C2.

With the control port 47, there connected via an orifice 58 a second solenoid valve S2 for changing the output pressure. This second solenoid valve S2 is of the normally open type for outputting the signal pressure when OFF and is so duty-controlled that its output pressure lowers according to the increase in the duty ratio. Incidentally, reference numeral 59 designates an L-range port for feeding the L-range pressure which is outputted from the manual valve when the low range for setting a first speed for the engine braking effect is selected.

Specifically, the second clutch control valve 44 functions to balance the sum of the axial force of the spring 48 and the axial force, as based upon the output pressure acting upon the feedback port 49, with the axial force, as based upon the signal pressure of the second solenoid valve S2 acting upon the control port 47, so that the output pressure is so regulated as to rise with the rise in the signal pressure of the second solenoid valve S2. In the state where the signal pressure of the second solenoid valve S2 is at a considerable level, the spool 46 is held in the position, as shown at the lefthand half of FIG. 6, so that the line pressure is fed as it is to apply the second clutch C2 completely.

Figure 7:
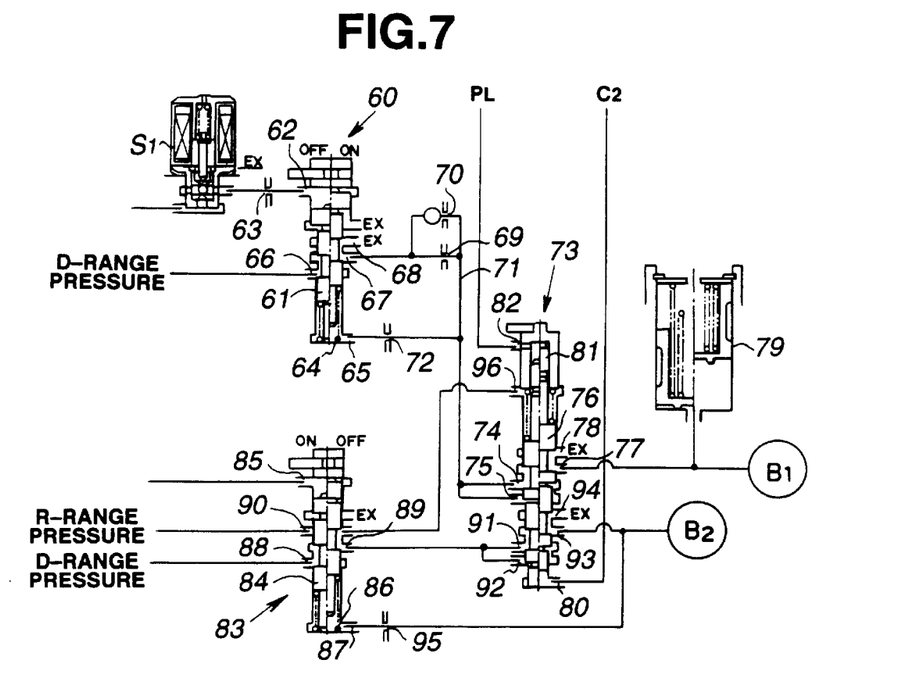
FIG. 7 is a diagram of a portion of the hydraulic circuit, as directed to a first brake and a second brake.

The hydraulic circuit for controlling the first brake B1 and the second brake B2 is shown in FIG. 7. A first brake control valve 60 for controlling the oil pressure of the first brake B1 is similar to the aforementioned second clutch control valve 44 and is equipped with a spool 61 having three lands, of which the land at one end portion is made diametrically larger than the remaining lands. At the side of this diametrically larger land, there is formed a control port 62 which is connected via an orifice 63 with a first solenoid valve S1 for outputting a signal pressure when OFF. This first solenoid valve S1 is so duty-controlled that its output pressure lowers as the duty ratio increases. At the side opposed to the diametrically larger land, there is arranged a spring 64 at the end portion where a feedback port 65 is formed.

In the axially intermediate portion of the first brake control valve 60, moreover, there are formed an input port 66, an output port 67 and a drain port 68 which are arranged sequentially in the recited order from the side (i.e., the lower side of FIG. 7) of the feedback port 65. Of these, the input port 66 is fed with the aforementioned D-range pressure, and the output port 67 is connected with an oil passage 71 which is provided with an orifice 69 and an orifice 70 having a check ball in parallel. With this oil passage 71, there is connected via an orifice 72 the aforementioned feedback port 65.

In this first brake control valve 60, therefore, the output pressure acts upon the feedback port 65, and the elastic force of the spring 64 acts together upward of FIG. 7. On the other hand, the axial force, as based upon the signal pressure of the first solenoid valve S1, acts downward of FIG. 7 so that the output pressure is regulated to balance those axial forces. When the signal pressure of the first solenoid valve S1 is higher a predetermined level, the spool 61 is held at the position, as shown at the lefthand half of FIG. 7, so that the D-range pressure is outputted as it is to the oil passage 71.

The oil passage 71, as connected with the output port 67 of the first brake control valve 60, is further connected with a first input port 74 of a fail-safe valve 73 and a first signal pressure port 75 adjacent to the former. This fail-safe valve 73 is equipped with a spool 76 having two diametrically larger lands, two diametrically intermediate lands and one diametrically smaller land. These lands are formed sequentially in the recited order downward of FIG. 7, and the first signal pressure port 75 is formed at a position to be opened between one diametrically larger land and the adjoining diametrically intermediate land. As a result, the oil pressure, as fed to the first signal pressure port 74, urges the spool 76 upward of FIG. 7.

Over the first input port 74, as seen from FIG. 7, there are sequentially formed a first output port 77 and a drain port 78 so that the first output port 77 is selectively connected with the first input port 74 and the drain port 78. The first brake B1 and a damper 79 are connected with that first output port 77.

At the end portion of the fail-safe valve 73 at the side of the diametrically smaller land of the spool 76, there is formed a control port 80 which is fed with the oil pressure of the second clutch C2. AT the opposite end portion, on the other hand, there is arranged a plunger 81 which is formed at its end portion with a control port 82 fed with the line pressure PL.

Here will be described a second brake control valve 83 for controlling the second brake B2. This second brake control valve 83 is equipped with a spool 84 having three lands of the same diameters. At one end side of this spool 84, there is formed a control port 85 which is fed with the output signal pressure of the (not-shown) linear solenoid valve for the lockup clutch 8. At the opposite end portion of the control port 85, there is arranged a spring 86 at a portion where a feedback port 87 is opened.

At the axially intermediate portion of the second brake control valve 83, there are formed a D-range pressure input port 88, an output port 89 and an R-range pressure input port 90 sequentially from the side of the feedback port 87. Of these, the D-range pressure input port 88 is fed with the aforementioned D-range pressure, and the R-range pressure input port 90 is fed with the R-range pressure which is outputted from the manual valve when a reverse (R) range is selected.

The output port 89 of the second brake control valve 83 is connected with a second input port 91 and a second signal pressure port 92 in the aforementioned fail-safe valve 73. Of these, the second signal pressure port 92 is opened between the radially smaller land and the adjacent diametrically intermediate land so that the oil pressure acting upon the second signal pressure port 92 establishes an axial force for urging the spool 76 upward of FIG. 7. Between the second input port 91 and the aforementioned first signal pressure port 75, on the other hand, there are formed a second output port 93 and a drain port 94 sequentially in the recited order from the lower side of FIG. 7. Of these, the second output port 93 is connected with the second brake B2. In order to apply the oil pressure of the second brake B2 to the aforementioned feedback port 87, on the other hand, the second output port 93 is connected via an orifice 95 with the feedback port 87.

In the fail-safe valve 73 between the spool 76 and the plunger 81, there is opened a third signal pressure port 96 which is connected with the aforementioned R-range pressure input port 90.

In the state where the spool 76 in the fail-safe valve 73 is pushed down to the position, as shown at the lefthand half of FIG. 7, therefore, the second input port 91 and the second output port 93 communicate with each other so that the oil pressure, as regulated by the second brake control valve 83, is fed to the second brake B2. In the second brake control valve 83, moreover, the second brake pressure or the output pressure acts upon the feedback port 87 so that a pressure regulating action like those of the second clutch control valve 44 and the first brake control valve 60 is caused to set the output pressure according to the pressure applied to the control port 85. When the oil pressure acting upon the control port 85 is higher than a predetermined level, the spool 84 is held in the position, as shown at the lefthand half of FIG. 7, so that the D-range pressure is outputted as it comes.

Figure 8:
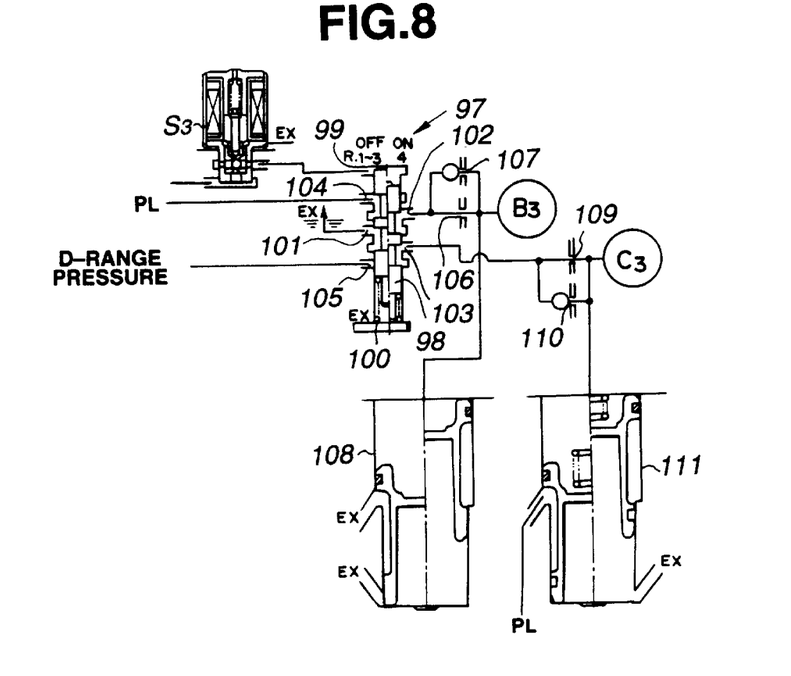
FIG. 8 is a diagram of a portion of the hydraulic circuit, as directed to a third clutch and a third brake.

FIG. 8 shows a hydraulic circuit for controlling the frictional engagement elements in the second speed change unit 12. The third clutch C3 and the third brake B3 in the second speed change unit 12 are constructed such that one is applied whereas the other is released. This is switched by a 3–4 shift valve 97 for changing the feed of the D-range pressure to the third clutch C3 and the feed of the line pressure PL to the third brake B3. Specifically, the 3–4 shift valve 97 is equipped with a spool 98 having three lands of the same diameters. At the side of one end portion of the spool 98, there is formed a control port 99 which is connected with a third solenoid valve S3. This third solenoid valve S3 is of the normally closed type ON/OFF valve for outputting the input pressure unchangedly as the signal pressure when ON and for reducing the signal pressure to zero when OFF. A spring 100 is arranged at the opposite end portion of the control port 99.

At the axially central portion of the 3–4 shift valve 97, there is formed a drain port 101, across which are formed a brake port 102 and a clutch port 103. Moreover, a line pressure input port 104 is formed at the opposite side of the drain port 101 across the brake port 102, and a D-range pressure input port 105 is formed at the opposite side of the drain port 101 across the clutch port 103. Specifically, when the spool 98 is pushed up to the position, as shown at the lefthand half of FIG. 8, the line pressure input port 104 communicates with the brake port 102, and the clutch port 103 communicates with the drain port 101. When the spool 98 is pushed down to the position, as shown at the righthand half of FIG. 8, the D-range pressure input port 105 communicates with the clutch port 103, and the brake port 102 communicates with the drain port 101.

With the brake port 102, moreover, there are connected the third brake B3 and an accumulator 108 via an orifice 106 and an orifice 107 having a check ball, as arranged in parallel with each other. With the clutch port 103, on the other hand, there are connected the third clutch C3 and an accumulator 111 via an orifice 109 and an orifice 110 having a check ball, as arranged in parallel with each other.

Figure 9:
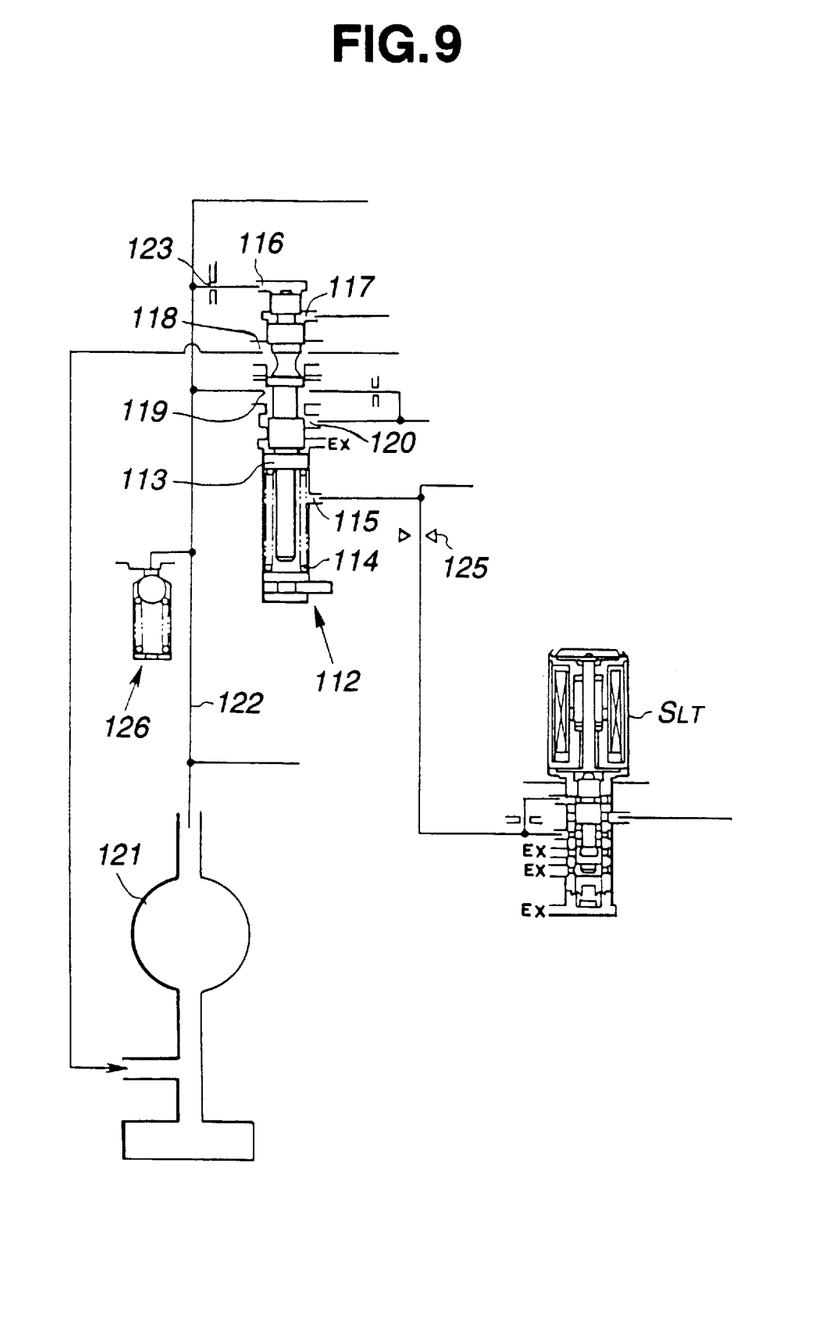
FIG. 9 is a diagram of a portion of the hydraulic circuit and shows one example of a line pressure regulating mechanism.

As described above, the individual frictional engagement elements are applied by either the line pressure PL or the D-range pressure which is outputted from the manual valve as unregulated from the line pressure PL. As a result, the torque capacities of the frictional engagement elements are substantially determined by the line pressure PL. This line pressure PL is regulated by a primary regulator valve 112, as shown in FIG. 9. This primary regulator valve 112 is equipped with a spool 113 having a plurality of lands of different face areas, of which the land at the lower end side of FIG. 9 has the largest diameter. Below this diametrically larger land, as located at the lower side of FIG. 9, there is arranged a spring 114. A signal pressure port 115 is formed at a portion where the spring 114 is arranged.

Moreover, the land, as located at the upper end of FIG. 9, of the spool 113 is given the smallest diameter, and a feedback port 116 is opened at the end face side of the diametrically small land. A control port 117 is opened below the radially small land, and a drain port 118 is opened below the second land from the top of FIG. 9. The external diameter of a valley at a portion corresponding to the drain port 118 is formed into such a drum shape that its axially central portion is gradually reduced in diameter. Below the drum-shaped portion, as viewed in FIG. 9, and across the land, there is formed another valley, at which is formed an input port 119. An output port 120 is formed below the input port 119, as viewed in FIG. 9.

The discharge port of an oil pump 121, as driven by the not-shown engine, is connected via a line pressure oil passage 122 with the input port 119 of the primary regulator valve 112 and via an orifice 123 with the feedback port 116. With the signal pressure port opened in the portion where the spring 114 is arranged, there is connected via an orifice 125 a normally open type solenoid valve SLT. This solenoid valve SLT is so duty-controlled according to the engine load (e.g., the throttle opening) to output the throttle pressure as outputs the highest throttle pressure when the duty ratio is 0% (i.e., in the OFF state) and reduces the throttle pressure to zero when the duty ratio is 100% (i.e., in the ON state).

In the primary regulator valve 112, therefore, the discharge pressure of the oil pump 121 acts upon the feedback port 116 so that the spool 113 is pushed downward of FIG. 9 when the downward load of FIG. 9, as based upon the discharge pressure, exceeds the sum of the elastic force of the spring 114 and the pressure, as based upon the throttle pressure acting upon the signal pressure port 115. As the spool 113 is thus moved, the input port 119 communicates with the drain port 118 to drain the oil pressure to act upon the input port 119, i.e., the discharge pressure of the oil pump 121. In accordance with this, the oil pressure to act upon the feedback port 116 lowers so that the spool 113 is pushed upward of FIG. 9 by the elastic force of the spring 114 and the throttle pressure to cut off the communication between the input port 119 and the drain port 118. This raises the discharge pressure of the oil pump 121 to act upon the input port 119. Accordingly, the oil pressure to act upon the feedback port 116 rises to push down the spool 113 again as in the aforementioned case.

In short, the primary regulator valve 112 regulates the oil pressure of the input port 119 so as to balance the axial forces across the spool 113. These axial forces across the spool 113 are increased with the rise in the throttle pressure, that is, the pressure regulating level rises with the throttle pressure so that the line pressure PL can be regulated to a proper level by controlling the solenoid valve SLT electrically to change its output pressure or the throttle pressure. Incidentally, reference numeral 126 appearing in FIG. 9 designates a relief valve.

Figure 10:
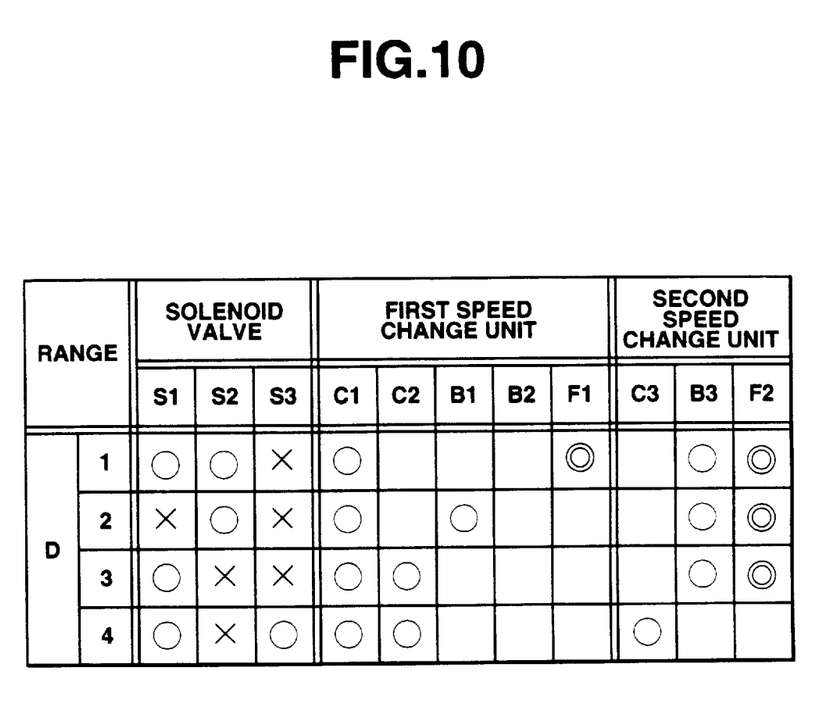
FIG. 10 is a clutch/brake application chart showing the active states of frictional engagement elements and solenoid valves for setting the individual forward stages in a D-range.

In the ordinary run with the D-range being selected in the automatic transmission 1 thus far described, the gear stages of the first speed to the fourth speed are set on the basis of the running state such as the vehicle speed and the throttle opening. FIG. 10 tabulates the applied/released states of the individual frictional engagement elements for the individual gear stages to be set in the D-range, together with the active states of the solenoid valves. In FIG. 10: symbols ○ indicate the ON state for the solenoid valves and the applied state for the frictional engagement elements; symbols X indicate the OFF state for the solenoid valves; symbols ⊙ indicate the applied state in the drive state; and blanks indicate the released state.

The clutches or brakes for setting those individual gear stages are applied by the oil pressure which is initialized by the line pressure PL, as described hereinbefore, and the line pressure PL per se is regulated to a high pressure in accordance with the engine load. This pressure regulation is executed by detecting the throttle opening electrically, by inputting the detected signal to the electronic control unit 32, by executing calculations on the basis of the input signal and by properly setting the duty ratio of the solenoid valve SLT for the aforementioned throttle pressure in accordance with the calculation result. For the larger throttle opening, more specifically, the duty ratio is set to the smaller value to raise the throttle pressure so that the pressure regulating level of the primary regulator valve 112 is raised to raise the line pressure PL. Thus, the torque capacities of the frictional engagement elements take pressures according to the input torque so that the torque is transmitted without any slip in the frictional engagement elements, while preventing the power loss which might otherwise be caused by the excessive drive of the oil pump 121.

Figure 1:
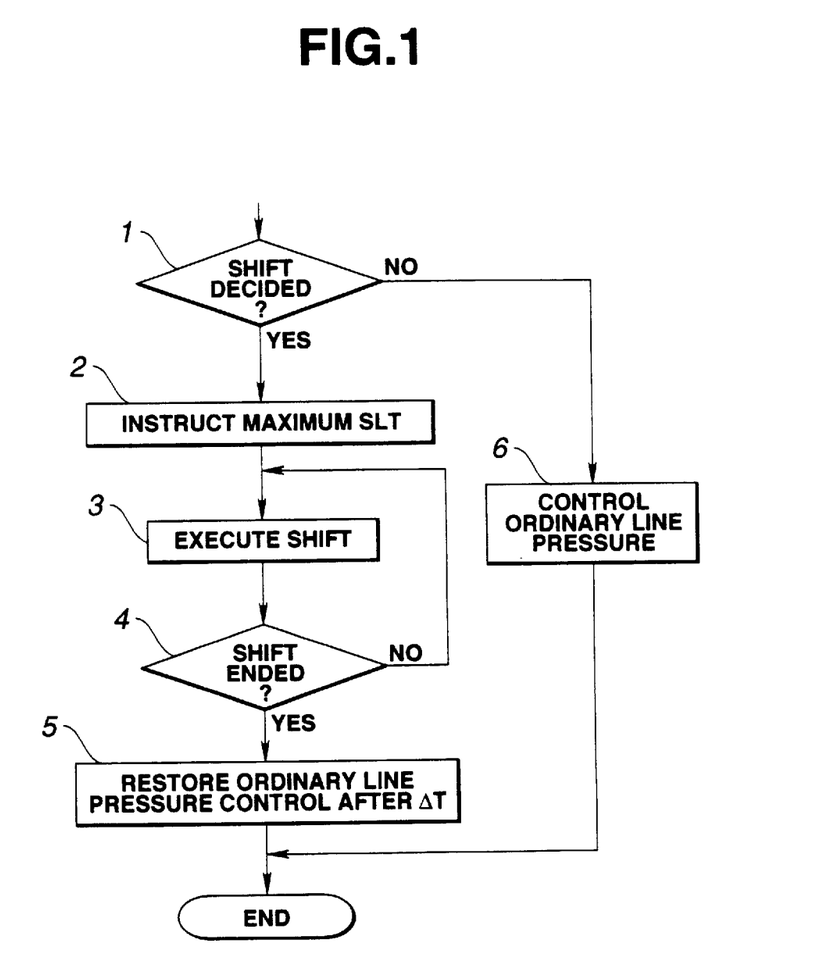
FIG. 1 is a flow chart for explaining one example of the control to be executed by an oil pressure control system of the present invention.

At a shifting time, on the other hand, the line pressure PL is raised to a constant level independently of the throttle opening (or the engine load). A control example is shown in a flow chart in FIG. 1. In this control example, it is decided (at Step 1) whether or not the shift decision holds. This can be decided as in the ordinary automatic transmission on the basis of the running state such as the throttle opening or the vehicle speed and the shift map stored in advance. When the answer of Step 1 is YES because the shift decision holds, an instruction signal to raise the output pressure of the solenoid valve SLT to the maximum is outputted (at Step 2).

Figure 2:
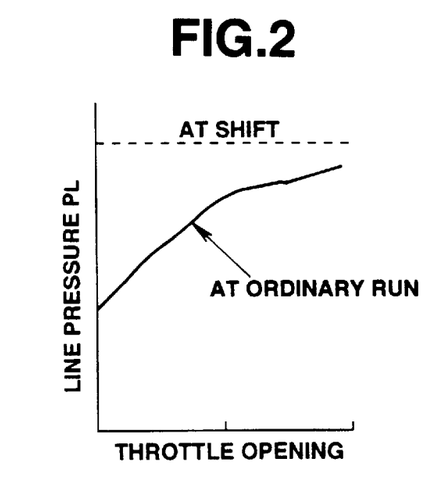
FIG. 2 is a diagram illustrating the line pressures by the control system at a shift time and at a normal run.

Since the solenoid valve SLT is duty-controlled to have the highest level when the duty ratio is at or near 0%, as described hereinbefore, the duty ratio of the solenoid valve SLT is set to 0%, for example, at Step 2. As a result, the throttle pressure to be fed to the signal pressure port of the primary regulator valve 112 rises so that the regulated value of the primary regulator valve 112 is increased to raise the line pressure PL to the maximum. This situation is shown in FIG. 2. In the ordinary state other than the shifting time, the line pressure PL is so regulated on the basis of the throttle opening as is set to the higher level for the larger throttle opening, i.e., for the higher engine load, as illustrated by a solid curve in FIG. 2. At the shifting time, on the other hand, the line pressure PL is set to the highest constant level independently of the throttle opening, as illustrated by a broken line in FIG. 2. Therefore, the operation of Step 2 corresponds to oil pressure holding means of the present invention.

Simultaneously with this, the shifting operation is executed (at Step 3). Specifically, the signals are so outputted to the predetermined shift solenoid valves Sl to S3 as to achieve a gear stage decided at Step 1, so that the shift is executed by switching the aforementioned individual control valves 44, 60 and 83 or 3–4 shift valve 97 by the output signals. Next, the end of the shift is decided (at Step 4). This shift end can be decided as in the ordinary automatic transmission in dependence upon whether or not the input RPM reaches the synchronous RPM of the gear stage after the shift.

This shifting process till the shift end is continued. At this shift end, the ordinary line pressure control is restored (at Step 5) a predetermined time ΔT after the decision of the shift end. This predetermined time may be zero seconds or longer. Moreover, this ordinary line pressure control is to set the line pressure PL to a level based upon the throttle opening. In this control, the line pressure PL is determined by the electronic control unit 32 on the basis of the detected throttle opening, and the duty signal is outputted to the solenoid valve SLT so as to set that pressure.

When the answer of Step 1 is NO because the shift decision fails to hold, on the other hand, the ordinary line pressure control is executed (at Step 6). Specifically, the line pressure is determined on the basis of the throttle opening, and the solenoid valve SLT is duty-controlled to establish that pressure.

Figure 3:
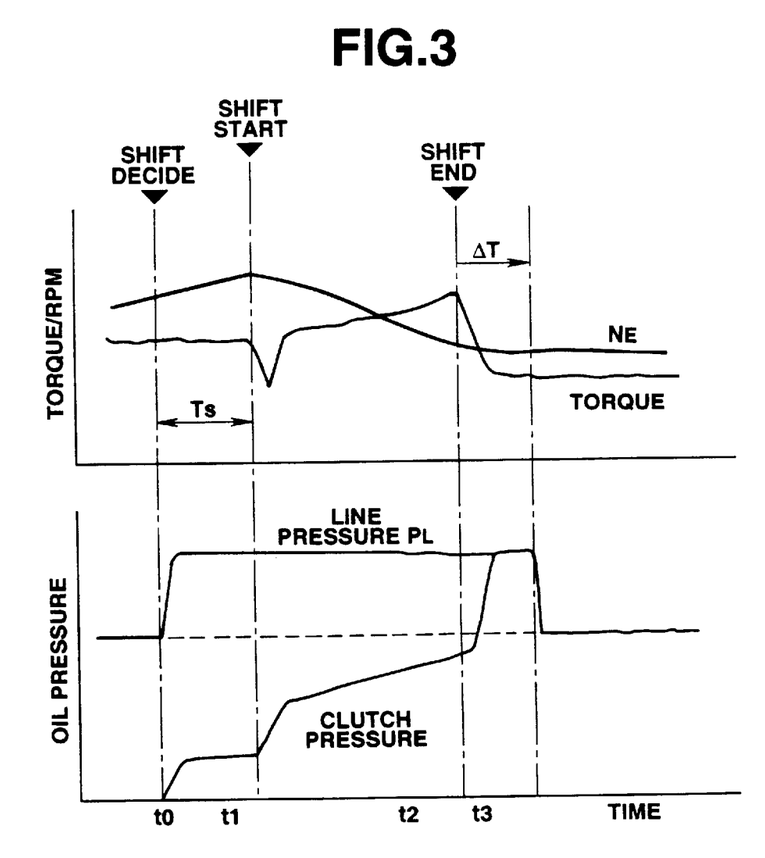
FIG. 3 is a time chart illustrating changes in the line pressure, the clutch pressure, the engine RPM and the output torque at an upshift for applying a clutch.

The changes in the line pressure PL, the clutch pressure, the output torque and the engine RPM NE when the aforementioned line pressure control is executed at an upshift for applying a predetermined clutch are illustrated by time charts in FIG. 3. In FIG. 3, the shift decision is made at time t0, and simultaneously with this the control for setting the line pressure PL to the maximum is started together with the feed of the oil pressure to the clutches.

The oil pressures are fed to the clutches from the control valves 44, 60 and 83 or the 3–4 shift valve 97 via the predetermined oil passages and the orifices disposed in the passages so that an inevitable delay is caused in the rise in the clutch pressure by their conduit resistances. On the other hand, the clutches are of the multi-disc type, as described hereinbefore, so that they are applied when their frictional discs are pushed by the not-shown piston. When the oil pressure is fed, the clearances (pack clearances) between the piston and the frictional discs are narrowed at first. As a result, the delay is inevitable before the torque capacities actually rise.

At time t1 after lapse of a predetermined delay time TS from the shift decision holding time t0, the shift is started so that the clutch pressures begin to rise to give the torque capacities to the clutches. The delay time TS of this case is made on the basis of the aforementioned conduit resistances and pack clearances but is always constant because its original pressure or the line pressure PL is set at the highest constant level that is free from the influence of the throttle opening, as described above. Moreover, this delay time TS is shortened by controlling the pressure rise to set the line pressure PL to the constant level, as described above.

After this, the shift advances while the clutch pressures being controlled by the control valves or the accumulators, and its end is decided at time t2 when the engine RPM NE is synchronized with the RPM after the shift. Simultaneously with this, the control of the clutch pressures is ended to raise the clutch pressures to the line pressure, and the line pressure PL is then returned to the level, which is based upon the throttle opening by the ordinary control, at time t3 after lapse of the predetermined time ΔT.

In the case of a shift accompanied by the aforementioned line pressure control, therefore, the time from the shift decision to the start of the shift for the frictional engagement elements to have the torque capacities is constant independently of the running state, that is, no discrepancy occurs in the application timings of the frictional engagement elements so that the stable shift control can be executed. In other words, the shift control is facilitated because it is unnecessary to change the control parameters of the application pressures of the frictional engagement elements on the basis of the throttle opening or the line pressure.

Especially in the case of the so-called "clutch-to-clutch shift" in which the applied/released states of the brakes and the clutches are simultaneously switched as in the aforementioned shift of the automatic transmission between the second speed and the third speed, less factors arises for causing the discrepancy in the applied/released timings of the clutches and brakes participating in the shift, so that the shock, as might otherwise be caused by the tie-up or the overshoot of the engine, can be effectively prevented.

Moreover, since the line pressure is raised to a constant level having no relation to the throttle opening, the timing for applying the frictional engagement elements, that is, the start of the shift is matured earlier to improve the shift responsibility. At the end of the shift, moreover, the raising control of the line pressure is ended to return the line pressure to a level according to the engine load such as the throttle opening thereby to avoid the disadvantages that the line pressure is kept at an unnecessary high level and that the power loss is accordingly increased.

In the foregoing specific embodiment, the line pressure is set at the shift time to the maximum level. However, the present invention should not be limited to the specific embodiment but may be modified such that the line pressure can be controlled to a constant level independent of the factors changing with the running state such as the throttle opening. Moreover, the rates of feeding/draining the oil pressure is influenced by the viscosity of the oil. When the oil is at a low temperature to have a high viscosity, the control level of the line pressure at the shifting time is increased to establish a high pressure. When the oil is at a high temperature, on the other hand, the control level of the line pressure may be lowered to eliminate or suppress the influence of the oil viscosity.

In addition, the present invention should not be limited to the specific embodiment thus far described but can be applied to an oil pressure control system for an automatic transmission equipped with a gear train other than that shown in FIG. 4.

Here will be synthetically described the advantages to be obtained from the present invention. According to the present invention, the initial pressure for applying the frictional engagement element is kept at the constant level at a shifting time so that the rate of feeding the oil pressure to and the timing for applying the frictional engagement elements participating in the shift can be made constant independently of the running state of the vehicle. As a result, it is possible to prevent the deterioration in the shift shock effectively. Moreover, the factors for fluctuating the pressures for applying the frictional engagement elements are reduced to facilitate the shift control. Still moreover, the shift responsibility can be improved if the level of the initial pressure to be kept at the shifting time is made higher than that which is determined on the basis of the engine load or the like.

What is claimed is:

1. An oil pressure control system for an automatic transmission in which an initial pressure of an oil pressure to be fed selectively to apply a frictional engagement element is controlled according to an engine load, comprising:

oil pressure keeping means for keeping said initial pressure during a shift at a constant level independent of the engine load.

2. An oil pressure control system according to claim 1, wherein said oil pressure keeping means includes means for keeping said initial pressure at a predetermined level for a predetermined time period from the instant when the decision of said shift holds to the instant when the end of said shift is decided.

3. An oil pressure control system according to claim 2, wherein said predetermined time period is substantially zero.

4. An oil pressure control system according to claim 1, further comprising:

means for changing said constant level on the basis of the oil temperature of said automatic transmission.

5. An oil pressure control system according to claim 1, wherein said shift includes a clutch-to-clutch shift in which the applied/released states of at least two frictional engagement elements are simultaneously changed.

* * * * *